United States Patent [19]

Kruse

[11] Patent Number: 5,148,007
[45] Date of Patent: Sep. 15, 1992

[54] METHOD FOR GENERATING RANDOM NUMBER FOR THE ENCODED TRANSMISSION OF DATA

[75] Inventor: Dietrich Kruse, Ottobrunn, Fed. Rep. of Germany

[73] Assignee: Siemens Aktiengesellschaft, Munich, Fed. Rep. of Germany

[21] Appl. No.: 769,491

[22] Filed: Oct. 1, 1991

Related U.S. Application Data

[63] Continuation of Ser. No. 490,439, Mar. 8, 1990, abandoned.

[30] Foreign Application Priority Data

Mar. 8, 1989 [DE] Fed. Rep. of Germany ....... 3907527

[51] Int. Cl.⁵ .................... G06K 5/00; G06F 15/30
[52] U.S. Cl. ..................... 235/382; 235/379
[58] Field of Search ............. 235/380, 379, 382, 492

[56] References Cited

U.S. PATENT DOCUMENTS

| | | | |
|---|---|---|---|
| 4,283,599 | 8/1981 | Atalla | 235/380 |
| 4,630,201 | 12/1986 | White | 235/380 |
| 4,709,136 | 11/1987 | Watanabe | 235/379 |
| 4,746,788 | 5/1988 | Kawana | 235/380 |
| 4,786,790 | 11/1988 | Kruse et al. | |
| 4,799,061 | 1/1989 | Abraham et al. | 235/379 |
| 4,974,193 | 11/1990 | Beutelspacher | 364/900 |

FOREIGN PATENT DOCUMENTS

0281057A2 9/1988 European Pat. Off.
2144564 3/1985 United Kingdom.

Primary Examiner—Stuart S. Levy
Assistant Examiner—Richard M. Weinberg
Attorney, Agent, or Firm—Hill, Van Santen, Steadman & Simpson

[57] ABSTRACT

Proceeding on the basis of a mutual authentification of two subscribers, wherein for one user an authorization parameter is formed using a secret cipher and an implemented ciphering algorithm dependent on a random number transmitted from the other subscriber, the authorization parameter being transmitted back to the other subscriber as a check, a new starting value for the one user's own random number generator is formed by a logical operation on the authorization parameter using the previous random number most recently generated and stored at the one user, the new random number of this random number generator being both stored as well as transmitted to the other subscriber.

1 Claim, 1 Drawing Sheet

METHOD FOR GENERATING RANDOM NUMBER FOR THE ENCODED TRANSMISSION OF DATA

This is a continuation of application Ser. No. 490,439, filed Mar. 8, 1990, now abandoned.

CROSS-REFERENCE TO RELATED APPLICATIONS

The present invention is related to the subject matter of U.S. Pat. No. 4,786,790 (hereby incorporated by reference) and U.S. Pat. No. 164,477, now U.S. Pat. No. 4,974,193 filed Mar. 4, 1988 (hereby incorporated by reference), both of which are assigned to the same assignee as the present invention.

BACKGROUND OF THE INVENTION

The present invention is directed to a method for generating a random number for the encoded transmission of data in a data exchange system having processor chip cards.

Protection of data is an ever more important aspect regarding modern data processing and communication systems. The degree of quality of a system with respect to adequate data protection is critically dependent upon the extent to which one succeeds in providing possible access to the system only for authorized persons and, conversely, of keeping unauthorized persons locked out with absolute reliability. A simple, if not absolutely reliable possibility for checking the access authorization to a system is, for example, the use of passwords that are only known to the authorized user and that can be changed by the user with arbitrary frequency. Since there is always the risk that passwords can be discovered or overheard by unauthorized persons, additional security measures are indispensable. One of these measures, for example, is the encoding and decoding of the transmitted information, a measure that can be realized in data processing systems by using a chip card.

A drawback regarding the increasing use of the chip card in communications systems, however, is the additional security risk due to the fact that chip cards can be relatively easily lost. Care must therefore be exercised to a great degree to ensure that a lost chip card is protected against potential misuse. The chip card is therefore designed such that the data stored in a protected chip card can only be accessed when an identifier stored in the chip card, for example, a personal identification number (PIN) is input in advance by the user.

A further security barrier to the system can be established by requiring an authentication of the chip card. This authentication prevents an arbitrary person or user of the system from accessing secret information in the system by pretending to be authorized. A critical prerequisite for the authentication is a personal feature of the user that cannot be copied. This feature of the user that cannot be copied is determined by using a secret cipher for the coding and decoding that is known to the two pertinent general components or partners of the system, i.e., first, the chip card and, second, the system itself. This feature is known only to these two partners. The security can be additionally enhanced by use of an arbitrary number that is transmitted by the chip card to the system, the arbitrary number being generated in the chip card upon use of the secret cipher. It would also be conceivable to produce these random numbers in a program-oriented fashion. In the opinion of security experts, however, random numbers generated in such fashion are not sufficiently random and, thus, are not ultimately reliable.

It is known that to increase the "randomness" of a random number, the generation of the random number can be made dependent on a variable starting value or, even better, this variable starting value can be modified with a random number that was previously generated.

SUMMARY OF THE INVENTION

An object of the present invention is to provide an optimally simple method that, in particular, is well-suited for use with chip cards for generating a modified starting value.

This object is inventively achieved by a method in which, proceeding from a mutual authentification of two users wherein an authorization parameter is formed using a secret cipher and a ciphering algorithm dependent on a random number received by one user from the other user and which is transmitted back to the other user as a check, a new starting value for the one user's own random number generator is formed by a logical operation on this authorization parameter with the previous random number most recently generated and stored at the one user, the new random number of this random number generator being also stored and transmitted to the other user. In the method the authorization parameter can be combined with the previous random number most recently generated via an exclusive-OR element.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
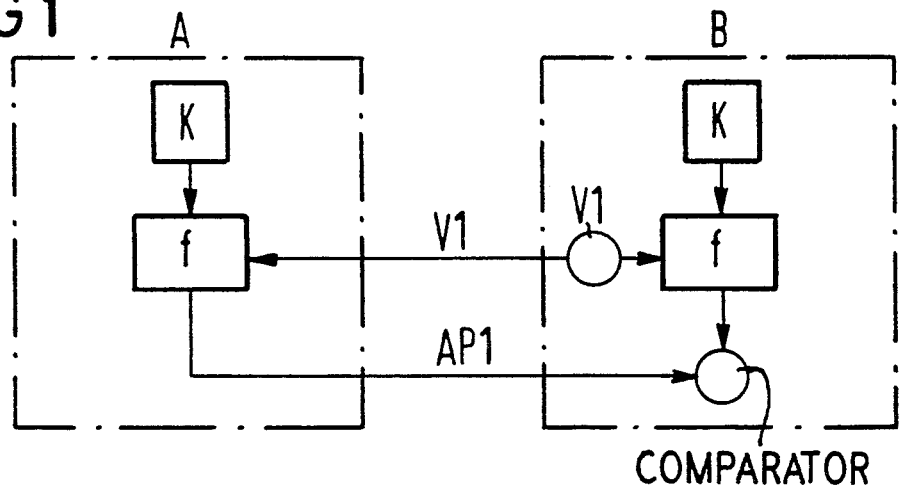
FIG. 1 is a diagram depicting in general the method of the present invention.
Figure 2:
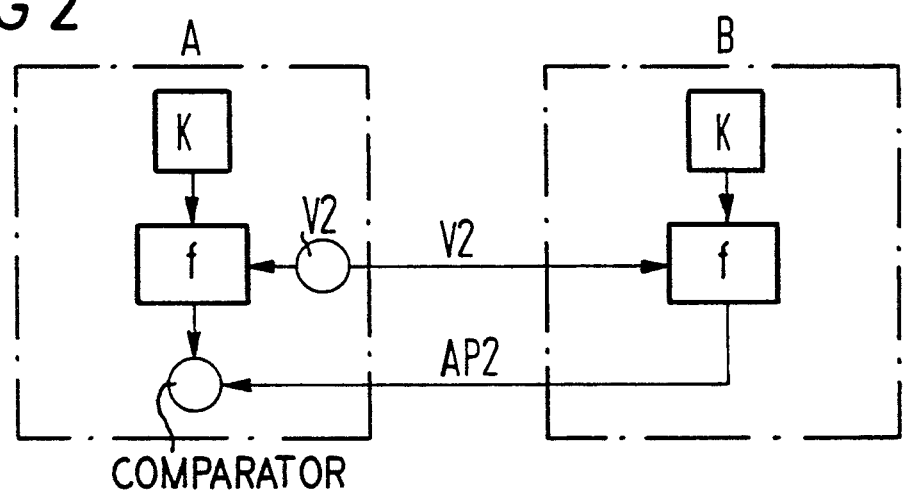
FIG. 2 is a diagram depicting the method of the present invention wherein two users of the system can identify one another.

The method of the present invention shall now be set forth in detail with reference to FIGS. 1, 2 and 3. The method involves the mutual authentication of two users A, B according to what is referred to as a "challenge response", as depicted in FIGS. 1 and 2. For example, a random number V1 is first sent from user B to user A where the random number V1 is encoded using a cipher K and a ciphering algorithm f. User A returns the result to user B as a first authorization parameter AP1. The user B carries out the same process and also receives this authorization parameter AP1. By comparing the two authorization parameters, the user B an identify whether he is in fact communicating with user A. So that user A is also sure that he is communicating with user B, this process is carried out in the opposite direction with the random number V2 and a second authorization parameter AP2 (see FIG. 2).

Figure 3:
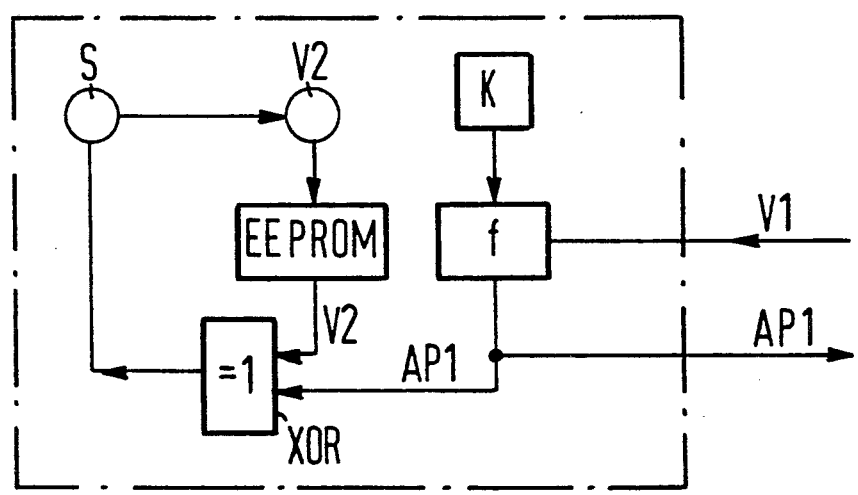
FIG. 3 is a diagram illustrating the generation of a variable starting value for a new random number.

As shown in FIG. 3, these mutually transmitted first and second authorization parameters AP1, AP2 are then advantageously used for generating a variable starting value for a new random number. For example, the authorization parameter AP1, generated at user A from the random number V1 transmitted by use B utilizing the cipher K and the ciphering algorithm f, and the random number V2 supplied by the user A in the preceding authorization and which was intermediately stored (for example in an EEPROM), are combined with one another by an exclusive-OR element XOR to form a new starting value s. This modified starting value s is used in a subsequent generation of a new random number V2 that is in turn again intermediately stored and transmitted to the user B. The generating of a modified starting value at user B proceeds analogously.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for generating a random number of encoded transmission of data for mutual authentication of two subscribers in a data exchange system using processor chip cards, comprising the steps of:
    a) providing for each of at least a first subscriber and a second subscriber, random number generator for generating a random number from a starting value, the random number generator connected to a memory means for storing the generated random number, logic means for logically combining the stored random number with an authorization parameter to produce a new starting value, function means for forming the authorization parameter from a stored cipher, a ciphering algorithm and an externally received random number, and comparator means for comparing the formed authorization parameter with an externally received authorization parameter;
    b) a first subscriber generating a first random number with its respective random number generator from a starting value previously stored at the first subscriber and storing this first random number in its respective memory means;
    c) the first subscriber transmitting the first random number to a second subscriber and, using a ciphering algorithm, using a cipher that is stored at the first subscriber and using the first random number, the first subscriber generating with its respective function means a first authorization parameter;
    d) the second subscriber, using the first random number transmitted from the first subscriber, using the cipher that is stored at the second subscriber and using the ciphering algorithm, also generating with its respective function means the first authorization parameter and transmitting the first authorization parameter to the first subscriber for comparison by the comparator means of the first subscriber;
    d) from a second random number most recently generated and stored at the second subscriber and from the first authorization parameter, the second subscriber forming a starting value for the random number generator at the second subscriber by means of a logical operation performed by its respective logic means;
    f) the second subscriber generating a second random number with its respective random number generator from the starting value formed in the step e), storing the second random number in its respective memory means and transmitting the second random number to the first subscriber;
    g) both subscribers generating a second authorization parameter from the second random number, from the cipher and from the ciphering algorithm with their respective function means;
    h) the first subscriber transmitting the second authorization parameter to the second subscriber for comparison by the comparator means of the second subscriber and forming a new starting value for the random number generator of the first subscriber from the stored, first random number and from the second authorization parameter by logical operation performed by the logic means of the first subscriber and storing the new starting value; and
    i) the first subscriber identifying the second subscriber by means of a valid comparison of the first authorization parameter generated by the first subscriber and of the first authorization parameter received by the first subscriber from the second subscriber, and the second subscriber identifying the first subscriber by means of a valid comparison in the comparator at the second subscriber of the second authorization parameter generated by the second subscriber and of the second authorization parameter received by the second subscriber from the first subscriber.

* * * * *